(12) United States Patent
Chen et al.

(10) Patent No.: US 9,013,205 B2
(45) Date of Patent: Apr. 21, 2015

(54) TESTING APPARATUS AND TESTING METHOD

(71) Applicants: Inventec (Pudong) Technology Corporation, Shanghai (CN); Inventec Corporation, Taipei (TW)

(72) Inventors: Lien-Feng Chen, Taipei (TW); Chun-Hao Chu, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 21 days.

(21) Appl. No.: 14/058,741

(22) Filed: Oct. 21, 2013

(65) Prior Publication Data

US 2014/0351641 A1 Nov. 27, 2014

(30) Foreign Application Priority Data

May 22, 2013 (CN) .......................... 2013 1 0192546

(51) Int. Cl.
*G01R 31/40* (2014.01)
*G01R 31/02* (2006.01)
*G01R 31/28* (2006.01)
*G06F 11/273* (2006.01)
*G06F 11/36* (2006.01)

(52) U.S. Cl.
CPC .......... *G06F 11/273* (2013.01); *G06F 11/3684* (2013.01)

(58) Field of Classification Search
CPC ........................... G06F 11/273; G06F 11/3684
USPC .................. 324/763.01, 764.01, 537; 714/32
See application file for complete search history.

(56) References Cited

U.S. PATENT DOCUMENTS 6,587,975 B2 * 7/2003 Mori et al. .................... 714/723

* cited by examiner

*Primary Examiner* — Jermele M Hollington
*Assistant Examiner* — Farhana Hoque
(74) *Attorney, Agent, or Firm* — Tim Tingkang Xia, Esq.; Morris, Manning & Martin, LLP

(57) ABSTRACT

The present disclosure provides a testing apparatus for executing a test program, to perform a first test on a circuit component on a circuit board and a second test on the circuit board. The testing apparatus includes a first module, a second module, and a signal transmission line that connects the two. The first module includes a control unit, a signal generation unit, a signal processing unit, a signal expansion unit, and a power supply unit. The control unit generates a first control signal or a second control signal. The signal generation unit generates a current signal or a voltage signal. The signal processing unit generates a numerical signal. The signal expansion unit generates a second data signal. The power supply unit generates a working voltage. The second module includes a test address assignment unit that assigns an address and a signal isolation unit that performs noise immunization process.

6 Claims, 2 Drawing Sheets

TESTING APPARATUS AND TESTING METHOD

CROSS-REFERENCE TO RELATED APPLICATIONS

This non-provisional application claims priority under 35 U.S.C. § 119(a) on Patent Application No(s). 201310192546.7 filed in China on May 22, 2013, the entire contents of which are hereby incorporated by reference.

BACKGROUND

1. Technical Field

The disclosure relates to a testing apparatus and a testing method, in particular, to a testing apparatus and a testing method that can reduce costs of equipment, manpower, and time, and improve testing efficiency.

2. Related Art

In recent years, as electronic technologies progress, printed circuit boards become stronger, more durable, lower in cost and higher in reliability. In the production of printed circuit boards, investment needs to be made for the cost of circuit layout at the beginning, but printed circuit boards can be cheaply, rapidly, and massively produced later.

After electronic components are soldered to a printed circuit board, the printed circuit board needs to pass a test before delivery. Actually, conventional insert circuit test (ICT) equipment mainly checks single circuit components and open-circuit and short-circuit conditions of each circuit network. That is to say, an ICT includes tests of circuit components such as resistors, capacitors, inductors, and transistors. Also, faults such as solder short-circuit, circuit component misplacement, circuit component missing, pin tilting, circuit component pseudo soldering, short-circuit, and broken circuit of a printed circuit board, can be found by means of the ICT. However, functions of a sub-assembly (SA) of a printed circuit board cannot be tested, for example, functions of a memory program, an operational amplifier, a power supply module, and a small-scale integrated circuit.

During test verification, a tester must separately perform tests in a test station for the ICT and in a test station for an SA function test, so as to test the electronic component and function of a printed circuit board. However, the separate test station increases the equipment cost and the manpower cost. In another aspect, the separate test station also increases the testing time.

Generally, most test platforms ulitilized in the prior art do not have a test interface integrating the ICT and the SA function test. Therefore the tester cannot perform different kinds of test verification on the same test platform, which increases the costs of equipment, manpower, and time and also affects the test efficiency.

SUMMARY

The disclosure provides a testing apparatus and a testing method, so as to reduce costs of equipment, manpower and time and improve test efficiency.

According to an embodiment of the disclosure, a testing apparatus is used for executing a test program, so as to perform a first test on circuit components on a circuit board and to perform a second test on the circuit board. The testing apparatus comprises a first module, a second module, and a signal transmission line. The first module comprises a control unit, a signal generation unit, a signal processing unit, a signal expansion unit, and a power supply unit. The control unit is used for receiving an instruction and generating a first control signal or a second control signal according to the instruction. The instruction is used for instructing the testing apparatus to perform the first test or the second test. The signal generation unit is coupled to the control unit, and is used for receiving the first control signal and generating a current signal or a voltage signal according to the first control signal. The signal processing unit is coupled to the control unit, and is used for receiving a measurement signal generated by the circuit board and performing numerical calculation on the measurement signal to generate a numerical signal. The signal expansion unit is coupled to the control unit, and is used for receiving a first data signal generated by the circuit board and expanding the first data signal to generate a second data signal. The power supply unit is coupled to the control unit, and is used for receiving the second control signal and generating a working voltage according to the second control signal. The second module comprises a test address assignment unit and a signal isolation unit. The test address assignment unit is coupled to the circuit board, and is used for assigning an address of multiple circuit components and returning a measurement signal to the signal processing unit according to the assigned address. The signal isolation unit is coupled to the test address assignment unit, and is used for performing noise immunization process on the measurement signal. The signal transmission line is coupled between the signal generation unit and the signal isolation unit, and is used for connecting the first module and the second module. When the testing apparatus performs the second test, the power supply unit generates a working voltage for the signal generation unit, the signal processing unit, the signal expansion unit, the test address assignment unit, and the signal isolation unit.

According to an embodiment of the disclosure, a testing method includes steps of connecting a test jig to a testing apparatus; configuring a circuit board on the test jig; actuating a first pneumatic cylinder of the test jig to prevent the circuit board from receiving a working voltage; executing a test program on the testing apparatus to perform a first test on circuit components on the circuit board, recording a first test result, and releasing the first pneumatic cylinder; actuating a second pneumatic cylinder of the test jig to enable the circuit board to receive the working voltage; executing the test program on the testing apparatus to perform a second test on the circuit board, recording a second test result, and releasing the second pneumatic cylinder; and displaying the first test result and the second test result.

In the testing apparatus and the testing method provided by the disclosure, when the control unit receives the instruction for performing the first test, the test address assignment unit assigns addresses for multiple circuit components on the circuit board, so that the signal processing unit can receive the measurement signal from the circuit components and perform numerical calculation on the measurement signal. Alternatively, when the control unit receives the instruction for performing the second test, the power supply unit generates the working voltage, so that the signal expansion unit receives the first data signal returned by the circuit board and expands the first data signal. Therefore, different kinds of tests can be effectively integrated on the same platform, reducing the costs of equipment, manpower, and time, and improving the testing efficiency.

The description on the content of the disclosure above and the description on the embodiments below are used to exemplify and explain the nature and principles of the present disclosure, and provide further explanation on the claims of the present disclosure.

BRIEF DESCRIPTION OF THE DRAWINGS

The present disclosure will become more fully understood from the detailed description given herein below for illustration only, and thus does not limit the present disclosure, wherein.

DETAILED DESCRIPTION

Figure 1:
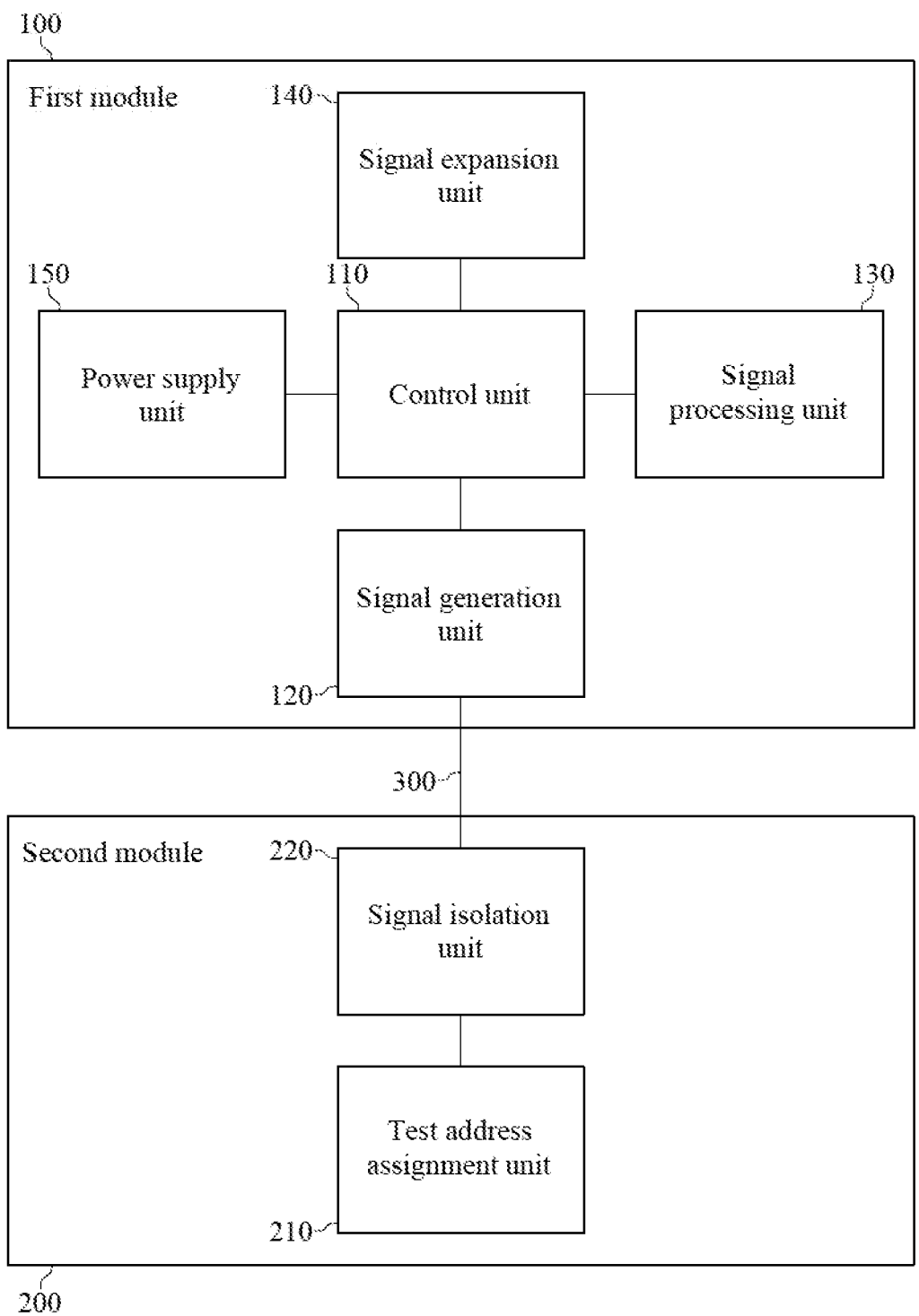
FIG. 1 is a schematic view of a testing apparatus of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed features and advantages of the disclosure are described below in great detail through the following embodiments, the content of the detailed description is sufficient for those skilled in the art to understand the technical content of the disclosure and to implement the disclosure there accordingly. Based upon the content of the specification, the claims, and the drawings, those skilled in the art can easily understand the relevant objectives and advantages of the disclosure. The following embodiments are intended to describe the disclosure in further detail, but not intended to limit the scope of the disclosure in any way.

FIG. 1 is a schematic view of a testing apparatus of the present disclosure. The testing apparatus 10 of this embodiment is applicable to an integrated test platform. That is to say, in this and some other embodiments, a user can use the testing apparatus 10 to simultaneously perform different kinds of test verification on the integrated test platform. The testing apparatus 10 is used for executing a test program, so as to perform a first test on circuit component on a circuit board and to perform a second test on the circuit board. In this embodiment, the first test can be, for example, an ICT, and the second test can be, for example, an SA function test. However, this embodiment is not limited thereto, the first test can also be, for example, implemented as another test similar to the ICT, and the second test can also be, for example, implemented as another test similar to the SA function test. The testing apparatus 10 includes a first module 100, a second module 200, and a signal transmission line 300.

The first module 100 comprises a control unit 110, a signal generation unit 120, a signal processing unit 130, a signal expansion unit 140, and a power supply unit 150. The control unit 110 is used for receiving an instruction and generating a first control signal or a second control signal according to the instruction. The instruction is used for instructing the testing apparatus 10 to perform the first test or the second test. The signal generation unit 120 is coupled to the control unit 110. And the signal generation unit 120 is used for receiving the first control signal and generating a current signal or a voltage signal according to the first control signal. The signal processing unit 130 is coupled to the control unit 110. And the signal processing unit 130 is used for receiving a measurement signal generated by the circuit board and performing numerical calculation on the measurement signal to generate numerical signal. In this embodiment, the numerical calculation can be, for example, calculation for a resistance value, an inductance value, or a capacitance value. However, this embodiment is not limited thereto, and the numerical calculation can be, for example, implemented as a numerical calculation of another similar circuit component.

The signal expansion unit 140 is coupled to the control unit 110. And the signal expansion unit 140 is used for receiving a first data signal generated by the circuit board and expanding the first data signal to generate a second data signal. The signal expansion unit 140 includes a general purpose input output (GPIO) port. In this embodiment, the second data signal can be, for example, an inter-integrated circuit (I2C) bus signal or a serial peripheral interface (SPI) signal. However, this embodiment is not limited thereto, and the second data signal can be, for example, implemented by using another similar signal.

The power supply unit 150 is coupled to the control unit 110, and the power supply unit 150 is used for receiving the second control signal and generating a working voltage according to the second control signal. In this embodiment, the working voltage can be, for example, 12V, 5V, or 3.3V. When the testing apparatus 10 performs the second test, the power supply unit 150 generates the working voltage for the signal generation unit 120, the signal processing unit 130, and the signal expansion unit 140.

The second module 200 comprises a test address assignment unit 210 and a signal isolation unit 220. The test address assignment unit 210 is coupled to the circuit board, and is used for assigning an address for the circuit component on the circuit board and returning a measurement signal to the signal processing unit 130 according to the address specification. The signal isolation unit 220 is coupled to the test address assignment unit 210, and the signal isolation unit 220 is used for performing noise immunization process on the measurement signal, so that the measurement signal is not interfered by noise.

The signal transmission line 300 is coupled between the signal generation unit 120 and the signal isolation unit 220, and is used for connecting the first module 100 and the second module 200. In this embodiment, the signal transmission line 300 can be, for example, a Bayonet Neill-Concelman (BNC) coaxial cable. However, this embodiment is not limited thereto, and the signal transmission line 300 can be, for example, implemented by using another similar transmission line.

For example, when the testing apparatus 10 performs the first test, the control unit 110 receives, for example, an instruction for performing the first test, so as to generate the first control signal for the signal generation unit 120, so that the signal generation unit 120 generates a current signal or a voltage signal for the circuit component on the circuit board. Meanwhile, the test address assignment unit 210 specifies the address for the circuit component on the circuit board. Accordingly, the circuit component receives the current signal or the voltage signal, and generates a measurement signal to return to the signal processing unit 130. The signal isolation unit 220 performs a noise immunization process on the measurement signal, so that the measurement signal are not interfered by noise. Next, the signal processing unit 130 performs a numerical calculation on the measurement signal to generate a numerical signal. With these steps, the testing apparatus 10 completes verification of the first test, in this and some other embodiments.

When the testing apparatus 10 performs the second test, the control unit 110 receives, for example, an instruction for performing the second test, so as to generate the second control signal for the power supply unit 150, so that the power supply unit 150 generates the working voltage for the signal generation unit 120, the signal processing unit 130, the signal expansion unit 140, the test address assignment unit 210, and the signal isolation unit 220. Next, the signal expansion unit 140 receives a first data signal generated by the circuit board, and expands the first data signal to generate a second data signal for a burner. In this and some other embodiments, the burner reads and stores the second data signal. With these steps, the testing apparatus 10 completes verification of the second test, in this and some other embodiments.

Further, in this and some other embodiments, by means of the above configuration relationship, the testing apparatus 10 provided by this embodiment can simultaneously perform verification operations of the first test and the second test on an integrated test platform. That is to say, in this and some other embodiments, tests such as the ICT and the SA function test, are simultaneously performed through the testing apparatus 10 of this embodiment, so as to further record and display a test result of the ICT and the SA function test.

Through description of the above embodiment, the testing apparatus 10 can be, for example, connected to a test jig to simultaneously perform the first test and the second test. For ease of description of how the first test and the second test are simultaneously performed, a testing method is used for further illustration below. A corresponding configuration relationship of the testing apparatus 10 is, for example, obtained with reference to the implementation manner of FIG. 1, which is not described herein again.

Figure 2:
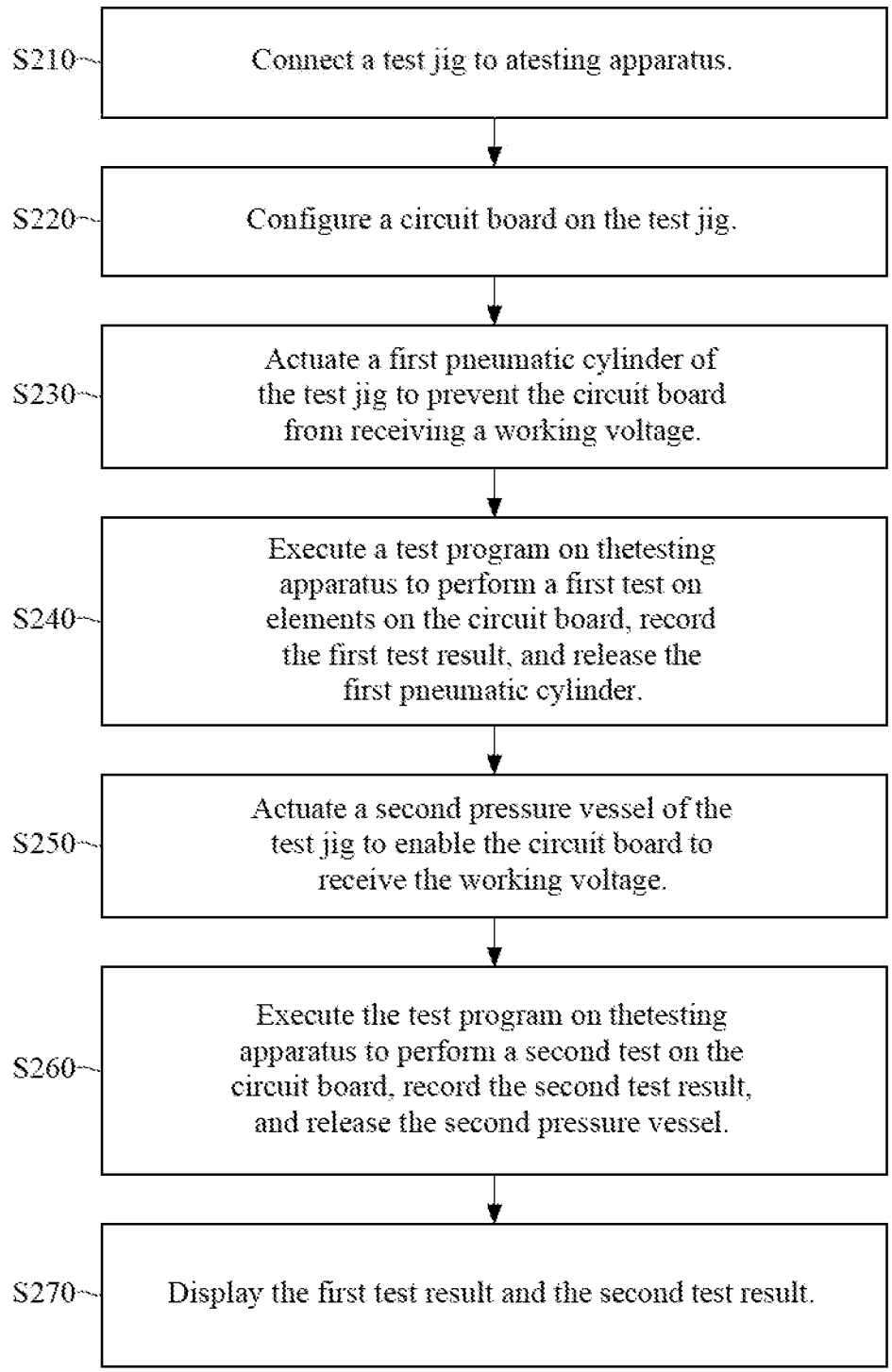
FIG. 2 is a flow chart of steps of a testing method of the disclosure.

FIG. 2 is a flow chart of steps of a testing method of the disclosure. In Step S210, a test jig is connected to the testing apparatus (for example, the testing apparatus 10 in FIG. 1). In Step S220, a circuit board is configured on the test jig. In Step S230, a first pneumatic cylinder of the test jig is actuated to prevent the circuit board from receiving a working voltage. In Step S240, a test program is executed on the testing apparatus, so as to perform a first test on the circuit component on the circuit board, the first test is recorded, and the first pneumatic cylinder is released.

In Step S250, a second pneumatic cylinder of the test jig is actuated to enable the circuit board to receive the working voltage. In Step S260, the test program is executed on the testing apparatus, so as to perform a second test on the circuit board, the second test is recorded, and the second pneumatic cylinder is released. In Step S270, a test result of the first test and the second test is displayed.

In the testing apparatus and the testing method disclosed in the embodiments of the disclosure, the control unit receives the instruction for performing the first test, and the test address assignment unit specifies the address for the circuit component on the circuit board, so that the signal processing unit receives the measurement signal returned from the circuit component and performs numerical calculation on the measurement signal. Alternatively, the control unit receives the instruction for performing the second test, and the power supply unit generates the working voltage, so that the signal expansion unit receives the first data signal returned by the circuit board and expands the first data signal. Therefore, different kinds of tests can be, for example, effectively integrated on the same platform, the costs of equipment, manpower, and time are reduced, and the testing efficiency is improved.

What is claimed is:

1. A testing apparatus, for executing a test program, so as to perform a first test on a circuit component on a circuit board and to perform a second test on the circuit board, comprising:
    a first module, comprising:
        a control unit, for receiving an instruction and generating a first control signal or a second control signal according to the instruction, wherein the instruction is for instructing the testing apparatus to perform the first test or the second test;
        a signal generation unit, coupled to the control unit, and used for receiving the first control signal and generating a current signal or a voltage signal according to the first control signal;
        a signal processing unit, coupled to the control unit, and used for receiving a measurement signal generated by the circuit board and performing numerical calculation on the measurement signal to generate a numerical signal;
        a signal expansion unit, coupled to the control unit, and used for receiving a first data signal generated by the circuit board and expanding the first data signal to generate a second data signal; and
        a power supply unit, coupled to the control unit, and used for receiving the second control signal and generating a working voltage according to the second control signal; and
    a second module, comprising:
        a test address assignment unit, coupled to the circuit board, and used for assigning an address for the circuit component and returning the measurement signal to the signal processing unit according to the address assigned; and
    a signal isolation unit, coupled to the test address assignment unit, and used for performing noise immunization process on the measurement signal; and
    a signal transmission line, coupled between the signal generation unit and the signal isolation unit, and used for connecting the first module and the second module;
    wherein when the testing apparatus performs the second test, the power supply unit generates the working voltage for the signal generation unit, the signal processing unit, the signal expansion unit, the test address assignment unit, and the signal isolation unit.

2. The testing apparatus according to claim 1, wherein the first test is an insert circuit test (ICT), and the second test is a sub-assembly (SA) function test.

3. The testing apparatus according to claim 1, wherein the signal expansion unit comprises a general purpose input output (GPIO) port.

4. The testing apparatus according to claim 1, wherein the second data signal is an inter-integrated circuit (I2C) bus signal or a serial peripheral interface (SPI) signal.

5. The testing apparatus according to claim 1, wherein the signal transmission line is a Bayonet Neill-Concelman (BNC) coaxial cable.

6. A testing method, comprising:
    connecting a test jig to the testing apparatus according to claim 1;
    configuring a circuit board on the test jig;
    starting a first pneumatic cylinder of the test jig to prevent the circuit board from receiving a working voltage;
    executing a test program on the testing apparatus to perform a first test on circuit component on the circuit board, recording the first test, and closing the first pneumatic cylinder;
    starting a second pneumatic cylinder of the test jig to enable the circuit board to receive the working voltage;
    executing the test program on the testing apparatus to perform a second test on the circuit board, recording the second test, and closing the second pneumatic cylinder; and
    displaying a test result of the first test and the second test.

* * * * *